United States Patent

[11] 3,622,543

| [72] | Inventor | John David Garforth<br>Manchester, England |
|---|---|---|
| [21] | Appl. No. | 790,159 |
| [22] | Filed | Jan. 9, 1969 |
| [45] | Patented | Nov. 23, 1971 |
| [73] | Assignee | Imperial Chemical Industries Limited<br>London, England |

[54] POLYAMIDES CONTAINING METAL SALT OF PYRIMIDINE OR TRIAZINE COMPOUND
6 Claims, No Drawings

[52] U.S. Cl.................................................... 260/78 R,
8/55, 260/47 CZ, 260/78 A, 260/78 L
[51] Int. Cl............................................................ C08g 20/38
[50] Field of Search............................................ 260/78, 78
A, 78 L, 78 SC, 47 CZ, 49

[56] References Cited
UNITED STATES PATENTS

| 3,249,590 | 5/1966 | Pietrusza et al............... | 260/78 |
|---|---|---|---|
| 3,296,204 | 1/1967 | Caldwell....................... | 260/78 |
| 3,438,949 | 4/1969 | Crovatt....................... | 260/78 |
| 3,448,085 | 6/1969 | Pietrusza et al............... | 260/78 |

*Primary Examiner*—Harold D. Anderson
*Attorneys*—Leonard Horn and Stephen D. Murphy ABSTRACT: Fiber-forming polyamides having an increased affinity for Basic Dyestuffs which are obtained by polymerizing polyamide forming components in the presence of a triazine or pyrimidine compound which contains at least one atom or group which is capable of reacting with amino groups present in the polyamide forming compounds, and which also contains at least one sulfonated arylamino group.

POLYAMIDES CONTAINING METAL SALT OF PYRIMIDINE OR TRIAZINE COMPOUND

This invention relates to polyamides and more particularly it relates to synthetic linear fiber-forming polyamides having an improved affinity for Basic Dyestuffs.

According to the invention there are provided synthetic linear fiber-forming polyamides, having an increased affinity for Basic Dyestuffs and a reduced affinity for Acid Dyestuffs, which are obtained by polymerizing a monoaminomonocarboxylic acid or an internal lactam thereof having at least two carbon atoms between the amino and carboxylic acid groups, or substantially equimolecular proportions of a diamine which contains at least two carbon atoms between the amino groups and a dicarboxylic acid which contains at least two carbon atoms between the carboxylic acid groups, in the presence of a small amount of a triazine or pyrimidine compound which contains at least one atom or group which is capable of reacting with amino groups in the polyamide forming components and which contains at least one sulphonated arylamino radical.

The polyamides of the invention can be obtained under the conditions normally employed for polymerizing a polymerizable monoamino-monocarboxylic acid, or a lactam thereof, or for polymerizing a mixture of a diamine and a dicarboxylic acid, or for polymerizing a mixture of a lactam, a diamine and a dicarboxylic acid, the said triazine or pyrimidine compound or mixture of such compounds being added at any stage of the polymerization process. It is however preferred to add the said compound during the initial stage of the polymerization, and, above all, at the stage of charging the reactants to the polymerization vessel.

The polymerization is preferably carried out at a temperature between 200° and 350° C. in an inert atmosphere until the required degree of polymerization is obtained.

When starting from a substantially equimolecular proportion of a diamine and a dicarboxylic acid the said compounds can be added to the polymerization vessel in the form of a salt of each other; thus, for example, hexamethylene diammonium adipate can be used instead of a mixture of equimolecular proportions of adipic acid and hexamethylenediamine. However the said salts dissociate into the separate components prior to polymerization taking place.

In this Specification the term "substantially equimolecular proportions" (of the diamine and of the dicarboxylic acid) is used to cover both strict equimolecular proportions and the slight departures therefrom which are involved in conventional viscosity stabilizing techniques.

If desired the said triazine or pyrimidine compound can be prereacted with a part of the monoamino-monocarboxylic acid or the diamine, the remainder of the polyamide forming components then being added, and the resulting mixture then subjected to polymerization.

Alternatively the polyamides of the invention can be obtained by mixing the said compound with the preformed polyamide, for example by blending the compound with the polyamide, and preferably with the polyamide in molten form. In this alternative process the said triazine or pyrimidine compound reacts with amino groups present at the ends of the polymer chains.

The amount of the said triazine or pyrimidine compound or compounds which is used is preferably between 0.1 and 10.0, and in particular between 0.5 and 2.0, molar percent based on the molecular weight of the recurring units of the polyamide chain.

When the said triazine or pyrimidine compound reacts with the amino groups present in the polyamide forming components with the formation of an acid, such as hydrochloric acid, then it is preferred to also include sufficient of an alkaline material, such as sodium hydroxide, to neutralize the acid which is formed.

As examples of atoms and groups present in the triazine or pyrimidine compound which are capable of reacting with amino groups present in the polyamide forming components there may be mentioned chlorine or bromine atoms or hydroxy, mercapto or amino groups or groups of the formula –X–R wherein X represents an oxygen or sulphur atom and R represents an alkyl, aralkyl or aryl radical, each of the said groups being directly attached to a carbon atom of the triazine or pyrimidine nucleus. As specific examples of the –X–R groups there may be mentioned methylthio, methoxy, ethoxy, benzyloxy, phenylthio and, above all, monocyclic aryloxy groups such as phenoxy or tolyloxy groups. The said triazine compounds are preferably 1,3,5-triazine derivatives. It is preferred that the triazine or pyrimidine compound contains two atoms or groups which are capable of reacting with the amino groups present in the polyamide forming components.

The sulphonated arylamino radicals present in the triazine or pyrimidine compound are preferably sulphonated anilino or naphthylamino radicals, such as 2-, 3- or 4-sulphoanilino, 2:4- or 2:5-disulphoanilino, 6- or 7-sulphonaphth-2-ylamino, 4-, 5- or 7-sulphonaphth-1-ylamino, 3:6, 5:7- or 6:8-disulphonaphth-2-ylamino, 3:6-disulphonaphth-1-ylamino and 3:6:8-trisulphonaphth-1-ylamino radicals.

The said triazine or pyrimidine compounds are preferably used in the form of a metal salt, in particular the sodium or potassium salts, of the sulphonic acids.

A preferred class of the said compounds for incorporation into the polyamides of the invention comprises the compounds of the formula:

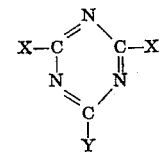

wherein X represents an atom or group capable of reacting with amino groups present in the polyamide forming components, and Y represents a sulphonated anilino or sulphonated naphthylamino radical. It is further preferred that X represents a hydroxy group, and, above all, a monocyclic aryloxy group in particular phenoxy.

As specific examples of this preferred class of compounds there may be mentioned 2:4-dichloro-6-(o-, m- or p-sulphoanilino)-1:3:5-triazine, 2:4-dichloro-6-(2':4'- or 2':5'-disulphoanilino)-1:3:5-triazine, 2:4-dihydroxy-6-(o-, m- or p-sulphoanilino)-1:3:5-triazine and 2:4-diphenoxy-6-(o-, m- or p-sulphoanilino)--sulphoanilino)-1:3:5-triazine.

If desired there can also be used triazine or pyrimidine compounds wherein the sulphonated arylamino radical also contains as a substituent the group (for example a carboxylic acid group) which is capable of reacting with amino groups present in the polyamide forming components. Thus there can be used 1:3:5-triazine or pyrimidine compounds which contain at least one, and preferably two, carboxysulphoanilino groups such as the 5-carboxy-2- sulphoanilino group.

As examples of the acid polymerizable monoamino-moncarboxylic acid groups or lactams thereof, which can be used to obtain the polyamides of the invention there may be mentioned ε-aminocaproic acid, caprolactam, dodecanolactam and enantholactam.

As examples of the said diamines there may be mentioned diamines of the general formula $H_2N(CH_2)_pNH_2$ wherein $p$ is an integer of from two to eight, such as trimethylenediamine, tetramethylenediamine, pentamethylenediamine, octamethylene-diamine and, above all, hexamethylenediamine.

As examples of the said dicarboxylic acids there may be mentioned isophthalic and terephthalic acid, but preferably the dicarboxylic acids of the formula HOOC.Y.COOH wherein Y is a divalent aliphatic radical containing at least two carbon atoms, and as examples of such acids there may be mentioned sebacic acid, octadecanedioic acid, suberic acid, azelaic acid, undecanedioic acid, glutaric acid, pimelic acid and, above all, adipic acid.

The preferred polyamides of the invention are those derived from hexamethylenediamine and adipic acid.

If desired other ingredients, such as delustrants, antioxidants, light stabilizers, heat stabilizers and molecular weight regulators, which are commonly present in fiber-forming polyamides can be added before, during or at the end of the polymerization stage of the present invention.

The polyamides produced by the process of the invention can be converted into filaments and fibers by any of the conventional methods of producing filaments and fibers from polymers, for example by melt spinning. The resulting filaments have excellent affinity for Basic Dyestuffs and this affinity is much greater than that of filaments prepared from the corresponding polymers which were prepared in the absence of the said triazine or pyrimidine compounds. The resulting filaments have also little or no affinity for Acid Dyestuffs.

The invention is illustrated but not limited by the following examples in which the parts and percentages are by weight.

EXAMPLE 1

100 parts of hexamethylene diammonium adipate, 1.69 parts of the sodium salt of 2:4-dichloro-6-(p-sulphoanilino)-1:3:5-triazine and 7.97 parts of a 4 percent aqueous solution of sodium hydroxide are charged to a reaction vessel, and the air is then displaced by nitrogen. The mixture is then heated to 275° C. under a reflux condenser, and maintained at this temperature for 30 minutes. Heating is continued at the same temperature for 30 minutes whilst the water present is distilled off. The mixture is then stirred for a further 30 minutes at the same temperature, and finally for a further 15 minutes at the same temperature under a pressure of 20 mms. of mercury. The resulting polyamide is then cooled and converted into the form of chips.

These chips are then converted into filaments by melt-spinning. The resulting filaments have a much higher affinity for Basic Dyestuffs than filaments of the polyamide which was obtained by polymerizing hexamethylene diammonium adipate on its own under the above conditions.

EXAMPLE 2

In place of the 1.69 parts of the sodium salt of 2:4-dichloro-6-(p-sulphoaniliano)-1:3:5-triazine and 7.97 parts of a 4 percent aqueous solution of sodium hydroxide used in example 1 there are used (a) 1.18 parts of the sodium salt of 2:4-dihydroxy-6-(m-sulphoanilino)-- 1:3:5-triazine (this being equivalent to one sulphonic acid group to every 100 units of the polyamide chain) and (b) 1.77 parts of the sodium salt of 2:4-dihydroxy-6-(m-sulphoanilino)-1:3:5-triazine (this being equivalent to 1.5 sulphonic acid groups to every 100 units of the polyamide chain).

In both cases the resulting filaments have a much higher affinity for Basic Dyestuffs than filaments of the polyamide prepared in the absence of the additive, and the filaments containing the higher amount of additive have a higher affinity than the filaments containing the smaller amount of additive.

EXAMPLE 3

A slurry of 262 parts of hexamethylene diammonium adipate, and 9.84 parts of the sodium salt of 2:4-diphenoxy-6-(p-sulphoanilino)- 1:3:5-triazine dihydrate in 100 parts of water at 90° C. is charged to a stainless steel autoclave. The autoclave is purged with steam, closed, and the autoclave is then heated until a pressure of 250 pounds per sq. inch (p.s.i.) and a temperature of 215° C. is obtained. Heating is then continued until a temperature of 240° C. is obtained whilst the pressure is maintained at 250 p.s.i. by slow release of steam from the autoclave. The pressure in the autoclave is then slowly reduced during 55 minutes to atmospheric pressure whilst the temperature is raised to 270° C. After 15 minutes at this temperature the polymer is discharged from the autoclave in the form of a ribbon which is cooled and cut into the form of chips. The chips are then converted by melt spinning into filaments.

The filaments have a much higher affinity for Basic Dyestuffs when applied from an aqueous dyebath than filaments of the polyamide which was obtained by polymerizing hexamethylene diammonium adipate on its own under the above conditions.

The sodium salt of 2:4-diphenoxy-6-(p-sulphoanilino)-1:3:5-triazine dihydrate used in the above example was obtained as follows:

A solution of 173 parts of sulfanilic acid, 40 parts of sodium hydroxide and 53 parts of sodium carbonate in 1035 parts of water was added, during 45 minutes, to a suspension of 184.5 parts of cyanuric acid in a mixture of 430 parts of water and 580 parts of ice containing 2 parts of a mixture of oleic acid and a sulphonated oleate. The mixture was stirred for a further 15 minutes, sodium carbonate being added as required to maintain the mixture just slightly acid to Congo Red. 250 parts of phenol were added, the temperature raised to 30° C., and 138 parts of a 32 percent aqueous solution of sodium hydroxide were then gradually added to maintain the mixture just alkaline to Brilliant Yellow. The temperature was then raised to 90° C., and maintained for 30 minutes during which time 160 parts of sodium bicarbonate were gradually added. The mixture was then cooled to 20° C., and the precipitated sodium salt of 2:4-diphenoxy-6-(p-sulphoanilino)- 1:3:5-triazine, in the form of the dihydrate, was filtered off, washed with water to remove sodium chloride, and dried.

EXAMPLE 4

In place of the 9.84 parts of the sodium salt used in example 3 are used 9.84 parts of the sodium salt of 2:4-diphenoxy-6-(m-sulphoanilino)-1:3:5-triazine dihydrate or 6.82 parts of the disodium salt of 2:4-diphenoxy-6-(6':8'-disulphonaphth- 2-ylamino)-1:3:5-triazine tetrahydrate when polyamide filaments are likewise obtained which also have excellent affinity for Basic Dyestuffs.

The triazine derivatives used in this example were obtained by the method described in the last paragraph of example 3 except that the 173 parts of sulphanilic acid were replaced by 173 parts of metanilic acid and by 271 parts of 2-naphthylamine-6:8-disulfonic acid respectively.

EXAMPLE 5

In place of the 9.84 parts of the sodium salt used in example 3 there are used 6.84 parts of the monosodium salt of 2:4-dihydroxy-6-(m-sulphoanilino)-1:3:5-triazine dihydrate, whereby filaments of a polyamide are obtained which also have excellent affinity for Basic Dyestuffs.

The monosodium salt of 2:4-dihydroxy-6-(m-sulphoanilino)- 1:3:5-triazine used in the above example was obtained as follows:

A solution of 173 parts of metanilic acid, 40 parts of sodium hydroxide and 53 parts of sodium carbonate in 1035 parts of water was added to a suspension of 184.5 parts of cyanuric chloride in a mixture of 430 parts of water and 580 parts of ice containing 2 parts of a mixture of oleic acid and a sulphated oleate. The mixture was stirred for 15 minutes at 0°–5° C., 375 parts of a 32 percent aqueous solution of sodium hydroxide were then added, and the mixture stirred for 4 hours at 30°–35 ° C. 3 parts of a decolorizing carbon were then added, the mixture stirred for 15 minutes, and then filtered. The filtrate was cooled to 20° C., hydrochloric acid added until the mixture was just acid to Congo Red, and 23.6 parts of a concentrated aqueous solution of hydrochloric acid were then added. After stirring for 16 hours at 20° C., the pH of the mixture was adjusted to 3.5 by addition of a sodium hydroxide solution, and the mixture cooled to 0° C. The precipitated monosodium salt of 2:4-dihydroxy-6-(m-sulphoanilino)-1:3:5-triazine, in the form of the dihydrate, was then filtered off, washed with ice-cold water and dried.

EXAMPLE 6

In place of the 9.84 parts of the sodium salt used in example 3 there are used 6.84 parts of the monosodium salt of 2:4-dihydroxy-6-(p-sulphoanilino)-1:3:5-triazine dihydrate, whereby filaments of a polyamide are obtained which also have excellent affinity for Basic Dyestuffs.

The sodium salt used in this example was obtained by the method described in the last paragraph of example 5 except that the 173 parts of metanilic acid were replaced by 173 parts of sulphanilic acid.

EXAMPLE 7

In place of the 1.69 parts of the sodium salt of the triazine compound and the 7.97 parts of sodium hydroxide solution used in example 1 there are used a. 3.76 parts of the sodium salt of 2:6-diphenoxy-4-(m-sulphoanilino) pyrimidine, or 4:6-diphenoxy-2-(m-sulphoanilino) pyrimidine, or b. 4.00 part of the sodium salt of 2:6-diphenoxy-4-(-m-sulphoanilino)-5-cyanopyrimidine and/or 4:6-diphenoxy-2-(m-sulphoanilino)-5-cyanopyrimidine, whereby polyamide fibers are also obtained which have a much higher affinity for Basic Dyestuffs than polyamide fibers which were obtained by polymerizing hexamethylene diammonium adipate on its own under the same conditions.

The sodium salt of the 2:6-diphenoxy-4-(m-sulphoanilino)pyrinidine and/or 4:6-diphenoxy-2-(m-sulphoanilino)pyrimidine was itself obtained as follows:

A mixture of 31 parts of 2:4:6-trichloropyrimidine, 2.2 parts of metanilic acid, 7.2 parts of sodium carbonate, 11.6 parts of a 32 percent aqueous solution of sodium hydroxide, 400 parts of water and 50 parts of acetone was stirred at 55° to 60° C. until tests showed that metanilic acid was no longer present. 39.7 parts of phenol and 28.7 parts of a 32 percent aqueous solution of sodium hydroxide were then added and the mixture stirred for 3 hours at the boil. The mixture was then cooled to 20° C., and the precipitated product filtered off, washed with water and dried.

The sodium salt of the 2:6-diphenoxy-4-(m-sulphoanilino)-5-cyanopyrimidine and/or 4:6-diphenoxy-2-(m-sulphoanilino)-5-cyanopyrimidine was itself obtained by replacing the 31 parts of 2:4:6-trichloropyrimidine used in the above method by 35.2 parts of 2:4:6-trichloro-5-cyanopyrimidine.

EXAMPLE 8

A mixture of 197.6 parts of the sodium salt of 2:4-diphenoxy-6-(m-sulphoanilino)-1:3:5-triazine, 92.8 parts of hexamethylenediamine and 1500 parts of water is stirred for 15 minutes at 20° C. The mixture is then heated to the boiling point and is maintained at this temperature until no more phenol distils over with the water. The resulting solution contains the sodium salt of 2:4-bis(ω-aminohexamethyleneamino)-6-(m-sulphoanilino)-1:3:5-triazine together with a little unreacted hexamethylenediamine.

To the solution is added 5240 parts of hexamethylene diammonium adipate and 71.5 parts of acetic acid, the mixture is charged to a stainless steel autoclave, and polymerization is then carried out under the conditions of time, temperature and pressure specified in example 3.

Filaments of the resulting polyamide have a much higher affinity for Basic Dyestuffs than filaments of the polyamide obtained by polymerizing an aqueous solution of hexamethylene diammonium adipate in the presence of only acetic acid and under the same conditions.

EXAMPLE 9

A mixture of 2.66 parts of the sodium salt of 2:4-diphenoxy-6-(*m*-sulphoanilino)-1:3:5-triazine and 32 parts of caprolactam is heated to 161° C. in a closed vessel which is then purged with nitrogen. Heating is continued for 25 minutes at the same temperature during which time the water evolved is distilled off. A solution of 1.201 parts of potassium hydroxide in 32 parts of caprolactam at 161° C., and the mixture heated for a further 75 minutes at the same temperature.

The resulting polyamide is then cooled, extracted with a hot 1.7 percent solution of formic acid, then washed with water and finally dried.

Fibers prepared from the resulting polyamide had a much higher affinity for Basic Dyestuffs than fibers of a polyamide which was similarly prepared by carrying out the polymerization of caprolactam in the presence of N-acetyl caprolactam instead of the said triazine derivative.

We claim:

1. A synthetic linear fiber-forming polyamide consisting essentially of the product obtained by polymerizing at a temperature between 200° and 350° C., a polyamide forming component selected from the group consisting of substantially equal molecular proportions of a diamine which contains at least two carbon atoms between the amino groups and a dicarboxylic acid which contains at least two carbon atoms between the dicarboxylic acid groups, in the presence of between 0.1 and 10.0 molar percent, based on the molecular weight of the recurring units of the polyamide chain, of a metal salt of a pyrimidine or triazine compound having the following general formula:

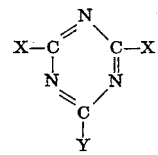

wherein X represents an atom or group capable of reacting with amino groups present in said polyamide forming component and Y represents a sulfonated anilino or sulfonated naphthylamino radical.

2. The polyamide as claimed in claim 1 wherein said diamine is a diamine selected from the group consisting of trimethylene diamine, tetramethylenediamine, pentamethylenediamine, octamethylenediamine, and hexamethylene diamine.

3. The polyamide as claimed in claim 1 wherein said dicarboxylic acid is an acid selected from the group consisting of sebacic acid, octadecanedioic acid, suberic acid, azelaic acid, undecanedioic acid, glutaric acid, pimelic acid and adipic acid.

4. The polyamide as claimed in claim 1 wherein said diamine is hexamethylenediamine and wherein said dicarboxylic acid is adipic acid.

5. A synthetic linear fiber-forming polyamide consisting essentially of the product obtained by polymerizing at a temperature between 200° C. and 350° C., a polyamide-forming component selected from the group consisting of a. a monoaminomonocarboxylic acid or a lactam thereof having at least two carbon atoms between the amino and carboxylic acid groups and b. substantially equal molecular proportions of a diamine which contains at least two carbon atoms between the amino and a dicarboxylic acid which contains at least two carbon atoms between the carboxylic acid groups, in the presence of between 0.1 and 10.0 molar percent based on the molecular weight of the recurring units of the polyamide chain of a metal salt of a triazine compound of the formula:

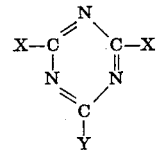

wherein X represents an atom or group capable of reacting with amino groups present in the polyamide-forming components, and Y represents a sulfonated anilino or sulfonated naphthylamino radical.

6. The polyamide of claim 5 wherein the polyamide-forming component is caprolactam.

PO-1050
(5/69)

UNITED STATES PATENT OFFICE
CERTIFICATE OF CORRECTION

Patent No. __3,622,543__ Dated __November 23, 1971__

Inventor(s) __John David Garforth__

It is certified that error appears in the above-identified patent and that said Letters Patent are hereby corrected as shown below:

Column 2, line 52, delete the second occurrence of the word "sulphoanilino"

Column 2, line 61, "acid" should read "said"

Column 3, line 47, "sulphoaniliano" should read "sulphoanilino"

Column 5, line 18, "and/" should be inserted prior to the word "or"

Column 5, line 29, "pyrinidine" should read "pyrimidine"

Column 6, line 5, the word "aqueous" should be inserted prior to the word "solution"

Signed and sealed this 5th day of December 1972.

(SEAL)
Attest:

EDWARD M. FLETCHER, JR.
Attesting Officer

ROBERT GOTTSCHALK
Commissioner of Patents